(12) United States Patent
Coles et al.

(10) Patent No.: US 10,948,402 B2
(45) Date of Patent: Mar. 16, 2021

(54) VIAL INSPECTION METHOD AND APPARATUS

(71) Applicant: Genentech, Inc., South San Francisco, CA (US)

(72) Inventors: Nicholas Coles, South San Francisco, CA (US); Makayla Gessford, South San Francisco, CA (US); Andrew David Norriss, Portland, OR (US); Mitsutaka Shirasaki, South San Francisco, CA (US)

(73) Assignee: Genentech, Inc., South San Francisco (GA)

( * ) Notice: Subject to any disclaimer, the term of this patent is extended or adjusted under 35 U.S.C. 154(b) by 0 days.

(21) Appl. No.: 16/696,945

(22) Filed: Nov. 26, 2019

(65) Prior Publication Data
US 2020/0173910 A1 Jun. 4, 2020

Related U.S. Application Data

(60) Provisional application No. 62/837,521, filed on Apr. 23, 2019, provisional application No. 62/773,985, filed on Nov. 30, 2018.

(51) Int. Cl.
*G01N 21/15* (2006.01)

(52) U.S. Cl.
CPC ........ *G01N 21/15* (2013.01); *G01N 2021/157* (2013.01)

(58) Field of Classification Search
CPC ........ G02B 1/041; G02B 1/043; G01N 21/94; G01N 33/15; G01N 21/8803;

(Continued)

(56) References Cited

U.S. PATENT DOCUMENTS 3,751,172 A * 8/1973 Seitz ................. B01L 9/06
356/244
4,063,823 A * 12/1977 Grat ................. G01N 21/9027
356/427

(Continued)

FOREIGN PATENT DOCUMENTS

WO WO2016/137789 A1 9/2016

OTHER PUBLICATIONS

Lewen et al.; The use of atomic spectroscopy in the pharmaceutical industry for the determination of trace elements in pharmaceuticals; Journals of Pharmaceutical and Biochemical Analysis; 55(4); pp. 653-661; Jun. 1, 2011.

(Continued)

*Primary Examiner* — Michael P Stafira
(74) *Attorney, Agent, or Firm* — Shay Glenn LLP

(57) ABSTRACT

A glass vial illumination and inspection system may be provided with a light source and a stand. The stand may have an internal cavity configured to receive at least a portion of the light source. A recess may be located in the stand and configured to receive at least a portion of a glass vial. The stand may be configured to aim the light output from the light source toward the glass vial to illuminate the vial. The stand may be configured to position the vial such that an inspector can manually inspect the illuminated vial for defects. Methods of use are also disclosed.

14 Claims, 10 Drawing Sheets

(58) Field of Classification Search
CPC .. G01N 21/9027; G01N 33/6854; G01N 1/34; G01N 1/4044; G01N 2015/0053; G01N 2015/0687; G01N 2015/0693; G01N 2021/157; G01N 2021/3155; G01N 2021/8845; G01N 2021/8887; G01N 21/15; G01N 21/314; G01N 21/49; G01N 21/6408; G01N 21/6428; G01N 21/6486; G01N 21/65; G01N 21/718; G01N 21/78; G01N 21/8806; G01N 21/8851; G01N 21/90; G01N 21/9009; G01N 21/9054; G01N 21/909; G01N 21/9508; G01N 2201/06113; G01N 2201/10; G01N 2201/13; G01N 2223/60; G01N 2333/01; G01N 23/04; G01N 23/083; G01N 23/10; G01N 23/16; G01N 23/18; G01N 33/4833; G01N 33/5076; G01N 33/574; G01N 33/57411; G01N 33/57492; G01N 33/6893; G01N 33/94; G01N 21/9036; G01N 21/9045; G01N 21/958; G01N 2021/845; G01N 2201/0626; G01N 33/386; G01N 21/896; G01N 21/93; G01N 2021/8411; G01N 2021/8427; G01N 2021/8841; G01N 2021/8883; G01N 21/255; G01N 21/27; G01N 21/8422; G01N 21/85; G01N 25/72; G01N 2021/1776; G01N 2021/8455; G01N 2021/8896; G01N 2021/9063; G01N 2021/9586; G01N 21/8903; G01N 2201/0438; G01N 2201/06146; G01B 11/00; G01B 11/08; G01B 11/2518; G01B 11/0633; G01B 11/026; G01B 11/06; G01B 11/0625; G01B 11/0691; G01B 11/24; G01B 11/2408; G01B 17/06; G01B 21/06; G01B 21/08; G01B 11/2504; G01B 11/254; G01J 3/42

See application file for complete search history.

(56) References Cited

U.S. PATENT DOCUMENTS

| | | | | |
|---|---|---|---|---|
| 4,417,662 | A | | 11/1983 | Nicholson et al. |
| 5,141,110 | A | * | 8/1992 | Trischan ............... B07C 5/3416 209/3.1 |
| 5,444,539 | A | * | 8/1995 | van der Grift ......... B65D 23/14 215/12.2 |
| 5,606,129 | A | * | 2/1997 | Lehmann ........... G01N 21/9009 250/223 B |
| 5,719,679 | A | | 2/1998 | Shimizu et al. |
| 5,940,176 | A | * | 8/1999 | Knapp ............... G01N 21/8803 356/239.4 |
| 6,064,479 | A | * | 5/2000 | Knapp ............... G01N 21/8803 356/240.1 |
| 6,473,169 | B1 | | 10/2002 | Dawley et al. |
| 7,626,158 | B2 | | 12/2009 | Diehr et al. |
| 9,176,071 | B2 | | 11/2015 | Weil et al. |
| 2009/0153838 | A1 | * | 6/2009 | Vugts ................. G01N 21/3586 356/51 |
| 2017/0283299 | A1 | | 10/2017 | Bookbinder et al. |

OTHER PUBLICATIONS

Chen et al.; Two-step procedure for trace element analysis in food via calibration-free laser-induced breakdown spectroscopy; Spectrochimica Acta Part B: Atomic Spectroscopy; vol. 150; pp. 77-85; Oct. 22, 2018.

St. Onge et al.; Quantitative analysis of pharmaceutical products by laser-induced breakdown spectroscopy; Spectrochimica Acta Part B: Atomic Spectroscopy; 57(7); pp. 1131-1140; Jul. 1, 2002.

Norriss; U.S. Appl. No. 16/696,974 entitled "Vial contents inspection and meterial idenification method and apparatus," filed Nov. 26, 2019.

* cited by examiner

VIAL INSPECTION METHOD AND APPARATUS

CROSS REFERENCE TO RELATED APPLICATIONS

This application claims the benefit of U.S. Provisional Application Ser. No. 62/773,985 filed Nov. 30, 2018, and U.S. Provisional Application Ser. No. 62/837,521 filed Apr. 23, 2019, each of which are herein incorporated by reference in its entirety.

INCORPORATION BY REFERENCE

All publications and patent applications mentioned in this specification are incorporated herein by reference in their entirety to the same extent as if each individual publication or patent application was specifically and individually indicated to be incorporated by reference.

FIELD

The present disclosure relates to inspection systems, in particular to systems and methods for inspecting glass vials.

BACKGROUND

Various products such as medicines are provided in glass vials. Medicines are often provided in a liquid or lyophilized form. Small cracks or fissures may develop in the glass vials, either before or during the vial filling process. These defects often occur in the heel of the vial (i.e. its outer, bottom edge) or just beneath the neck where the cap attaches to the top of the vial. These defects can be difficult to detect and can compromise the integrity of the vial and/or its contents. For example, medicine may leak from the vial through the crack. Air, moisture or other contaminants may enter the vial through the crack and contaminate the medicine. A fissure may propagate into a larger crack and cause the vial to break open. When this occurs at the base of the vial it is referred to as "lensing."

What is needed and not provided by the prior art are improved systems and methods to detect lensed vials.

SUMMARY OF THE DISCLOSURE

The present disclosure relates to vial inspection systems and methods. According to aspects of the disclosure, a glass vial illumination and inspection system may be provided with a light source and a stand. The stand may have an internal cavity configured to receive at least a portion of the light source. A recess may be located in the stand and configured to receive at least a portion of a glass vial. The stand may be configured to aim the light output from the light source toward the glass vial to illuminate the vial. The light directed at the vial is transmitted though the vial glass and interacts with the defects, making them more distinguishable. The stand may be configured to position the vial such that an inspector can manually inspect the illuminated vial for defects.

In some embodiments, the light source is a flashlight and the stand is configured to receive the flashlight in a central bore therein. The stand may be configured to hold the light source in a vertical orientation and configured to hold the vial above the light source. In some embodiments, the stand further comprises a base having a generally square shape. A top portion of the stand may be provided with at least two castellations. In some embodiments, a top portion of the stand is configured to hold a first type of vial, and the top portion is configured to releasably receive a vial adapter for holding a second type of vial that is different from the first type of vial. The adapter may include a plurality of recesses around its circumference, wherein the recesses are configured to mate with castellations extending from the stand. In some embodiments, the recesses and castellations cooperate to prevent the adapter from rotating with respect to the stand. The system may further comprise multiple vial adapters, each configured to receive a different type of vial.

In some embodiments, the system further comprises a vial adapter configured to hold a vial at a non-vertical angle. The vial adapter may be configured to hold a vial at an angle that is about 40 degrees from vertical. In some embodiments, the system may further comprise a bottom lid configured to releasably retain the light source within the internal cavity of the stand.

According to other aspects of the disclosure, methods of inspecting a glass vial are provided. In some embodiments, the method includes providing an illumination and inspection system as described above, inserting a glass vial into the recess of the stand, and inspecting the vial for defects. The method may further include spinning the vial within the recess while inspecting the vial for defects. In some embodiments of the method, the vial is spun at least two revolutions.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Before the present invention is further described, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a," "an," and "the" include plural referents unless the context clearly dictates otherwise. Thus, for example, reference to "the component" includes reference to one or more components, and so forth. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

The publications discussed herein are provided solely for their disclosure prior to the filing date of the present application. Nothing herein is to be construed as an admission that the present disclosure is not entitled to antedate such publication by virtue of prior invention. Further, the dates of publication provided may be different from the actual publication dates which may need to be independently confirmed.

Figure 1:
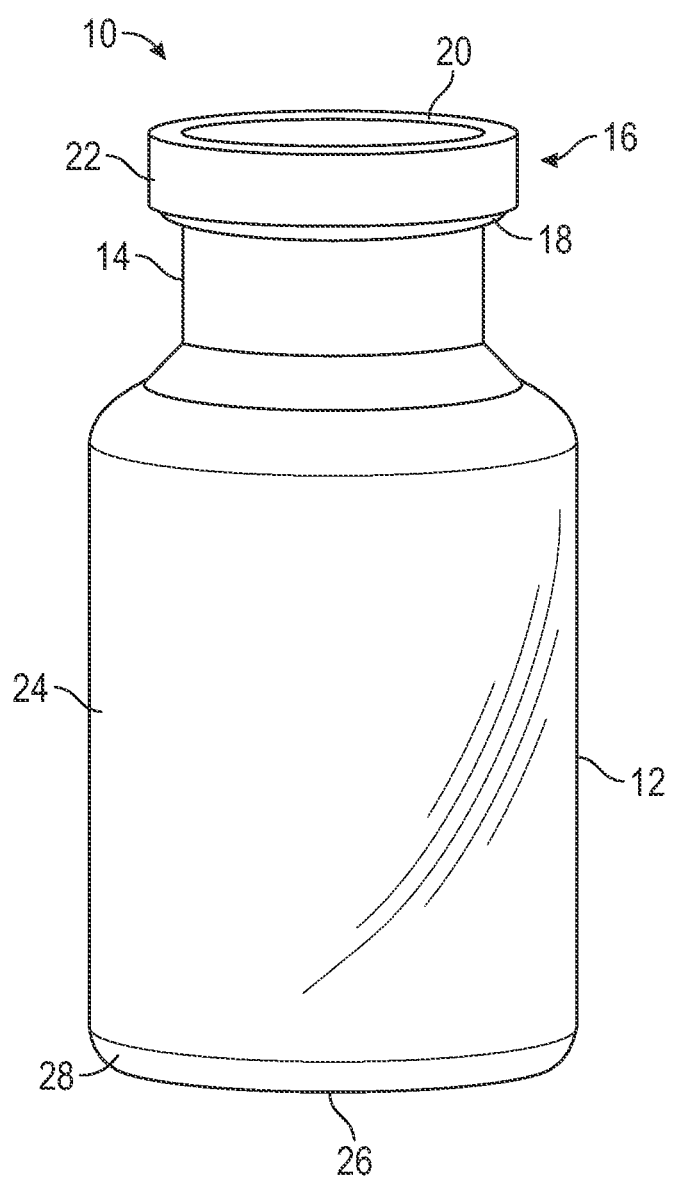
FIG. 1 is a side view showing a prior art glass vial to be inspected.

Referring to FIG. 1, an exemplary glass medicine vial 10 is shown. Medicine vials are manufactured in various shapes and sizes, but typically have a main portion 12 of constant diameter, a neck 14 having a reduced diameter, and a lip 16 or flange located around the vial opening (not shown) at the top of the neck 14. Flange 16 may have a diameter greater than that of neck 14 to provide an undercut portion or collar 18. After vial 10 is filled with medicine, the top may be sealed with a septum material or crown 20 held in place by a metal band, crimp, seal or finish 22 that covers a portion of crown 20, flange 16 and collar 18. Crown 20 may be pierced with a hypodermic needle to withdrawn medicine from the vial into a syringe. The curved edge located at the bottom of main portion 12 as the sidewalls 24 transition into the bottom surface or base 26 of the vial may be referred to as the heel 28 of the vial.

Lensing (which is identifiable by the base of the vial detached from the body) may occur in the glass vial. A vial lensing event is preceded by a defect in the heel 28 of the vial 10 that can be difficult to detect due to refraction of light in the curvature of the vial heel. A defect in the neck of the vial can also occur during crimping of the seal. Though this neck defect is not considered lensing, it can also be difficult to detect due to the seal partially obscuring it.

The above-described defects can compromise the integrity of the vial and/or its contents. For example, in some cases medicine might leak from the vial through the crack. Air, moisture or other contaminants might enter the vial through the crack and contaminate the medicine. A fissure might propagate into a larger crack and cause the vial to break open. Therefore, detecting a defect in a vial before any of the above adverse consequences occurs is desirable. Detecting defects as early as possible allows a vial to be removed from distribution early, thereby increasing public safety and reducing costs. According to aspects of the present disclosure, vials may be inspected for cracks or fissures immediately before and/or after filling and sealing.

Figure 2:
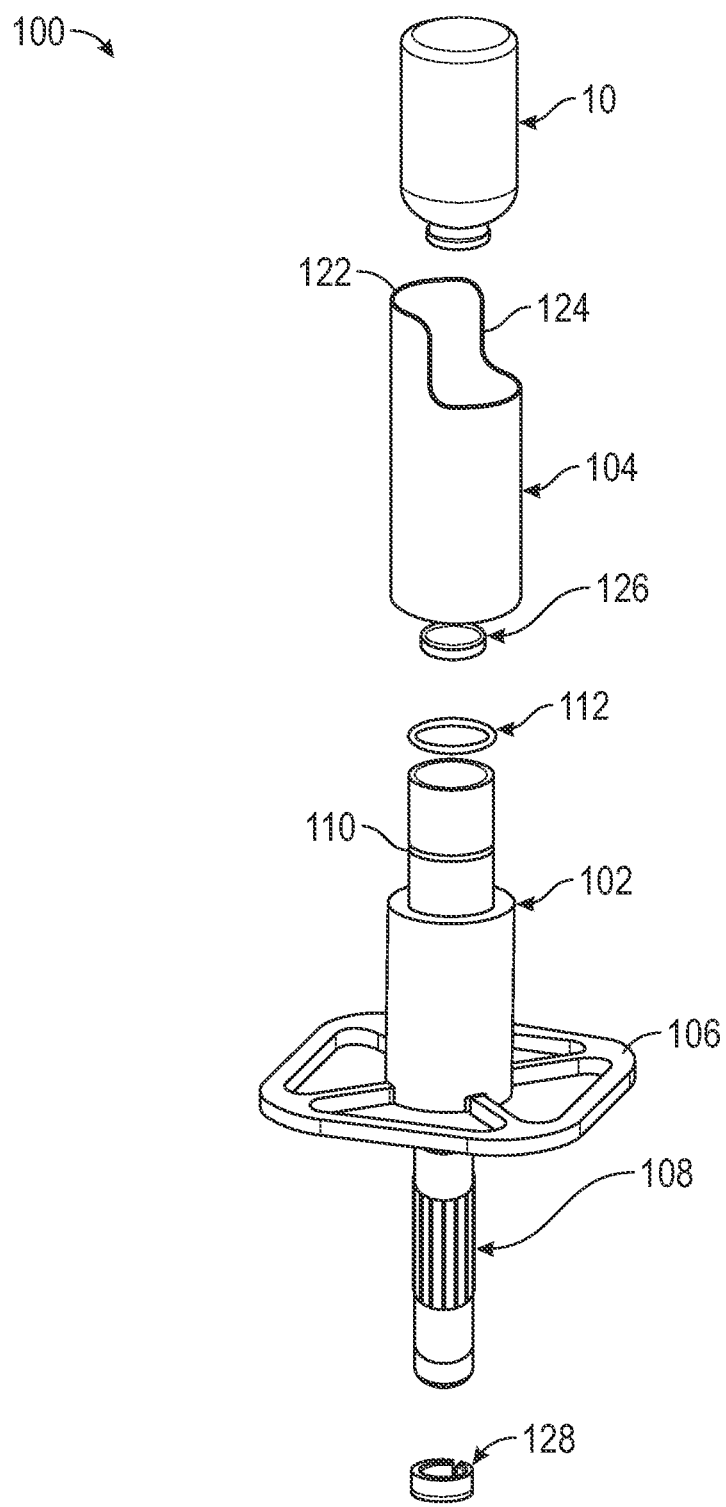
FIG. 2 is an exploded perspective view showing components of a first exemplary embodiment of a vial illumination and inspection system constructed according to aspects of the present disclosure.

Referring to FIG. 2, a first exemplary embodiment of a vial illumination and inspection system 100 constructed according to aspects of the present disclosure will be described. In this exemplary embodiment, inspection system 100 is configured to hold one vial 10 at a time for inspection, with each vial 10 being a 100 cc clear glass vial, but system 100 may be modified to inspect other sizes and types of vials, as will be subsequently described. System 100 includes a vial stand bottom 102 and a vial stand top 104. Vial stand bottom 102 may be provided with a base 106 that has a generally square shape as shown to increase stability and allow system to be more easily indexed in a desired orientation. Vial stand bottom 102 has an internal cavity (not shown) configured to receive a light source 108. Light source 108 shines light in an upward direction toward vial 10. In this exemplary embodiment, light source 108 is a standard LED flashlight with a maximum diameter of 1 inch, but other types of light sources may also be used, such as a remotely located light source optically coupled to vial stand bottom 102 with a fiber optic bundle. An upper cylindrical portion of stand bottom 102 may be provided with an external groove 110 sized to partially receive an O-ring 112. In some embodiments, vial stand bottom 102 and vial stand top 104 may be fabricated from a thermoplastic, such as a polylactic acid (PLA.) These components may be produced using 3-D printing, injection molding or other fabrication techniques.

Figure 3:
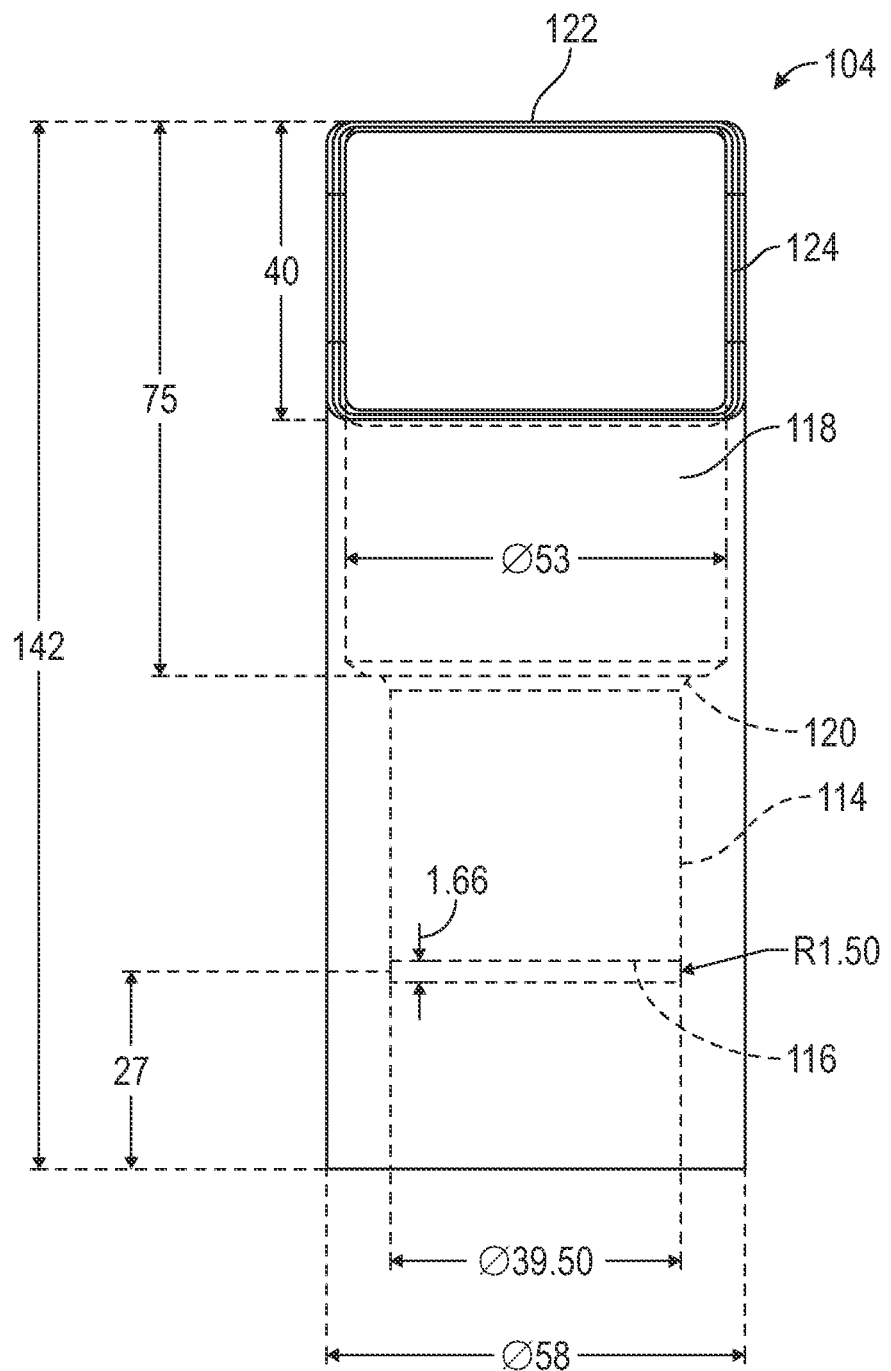
FIG. 3 is a side view showing the vial stand top of the system shown in FIG. 2, with dimensions provided in millimeters.

Referring to FIGS. 2-3, vial stand top 104 may be provided with an internal bore 114 sized to receive the upper cylindrical portion of stand bottom 102. Internal bore 114 may be provided with an internal groove 116 sized to partially receive O-ring 112. With this arrangement, vial stand top 104 may be slid on to vial stand bottom 102 and releasably locked in place by O-ring 112.

Vial stand top 104 may be configured to hold one 100 cc clear glass vial in an inverted position such that its heel may be inspected for defects. As shown in FIG. 3, stand top 104 may be provided with an internal cavity 118 for receiving vial 10. Cavity 118 may have a stepped down portion 120 sized to abut against the shoulder of vial 10 so that the vial is maintained at a predetermined height. In this exemplary embodiment, the bottom surface of vial 10 is recessed below the top edge 122 of stand top 104 when fully inserted therein so that stand top 104 provides a uniform background for viewing the bottom surface or 'base' of the vial. This white uniform background enhances an inspector's ability to identify dark/opaque defects that may be present on the base of lower sidewall regions of the vial. In other embodiments, the bottom surface of vial 10 may be flush with or stand proud of top edge 122. Stand top 104 may be made from or coated with a white material to aid in inspecting vial 10. Stand top 104 may be provided with a cutout portion 124 extending circumferentially 180 degrees as shown for exposing a portion of the side of vial 10. With this arrangement, an inspector can rotate vial 10 while it is inserted in stand top 104, such as by using his or her thumb on the side of the vial.

As shown in FIG. 2, system 100 may be provided with a diffusion plate 126 in stand bottom 102 between light source 108 and vial 10 to optimize the lighting conditions for locating defects in vial 10. In some embodiments, diffusion plate 126 is 0.3 mm thick. In some embodiments, multiple diffusion plates of various thicknesses are provided and are configured to be interchangeable depending on the type of defects being inspected. A bottom lid or spacer ring 128 may be located inside the bottom of vial stand bottom 102 to retain light source 108 therein. Bottom lid 128 may be provided with an outside diameter that is larger than the inside diameter of stand bottom 102, and its circumference may be provided with a longitudinal gap. With this arrangement, bottom lid 128 may be flexed inward (narrowing the longitudinal gap) when inserting or removing it from stand bottom 102. When inside the stand bottom 102, bottom lid 128 exerts an outward force that retains itself and light source 108 within stand bottom 102. This allows for easy removal and access to an on/off switch of light source 108.

In operation, an inspector removes bottom lid 128 and/or light source 108 to turn on the light source, and replaces both in vial stand bottom 102. In some embodiments (not shown), light source 108 may be inserted from the top of vial stand bottom 102 with or without first removing vial stand top 104. The inspector then places a vial 10 in the top recess of vial stand top 104 in an inverted orientation. The lighting, viewing and background conditions provided by inspection system 100 allow defects in the heel of vial 10 to be more easily detected. The inspector may rotate vial 10, vial stand top 104 and/or vial stand bottom 102 at least 360 degrees to view it from every angle. In some implementations, vial 10 may then be removed and replaced in stand top 104 in an upright orientation to inspect other portions of vial 10, such as the neck region just below the seal. Vial 10 may then be removed from system 100 and replaced with the next vial to be inspected. If the inspector desires to inspect a different vial type and/or inspect for a different defect type, vial stand top 104 may be removed from vial stand bottom 102 and replaced with a different vial stand top customized for the different vial type and/or defect type. Diffuser 126 may also be replaced with a different diffuser at this time.

Figure 4:
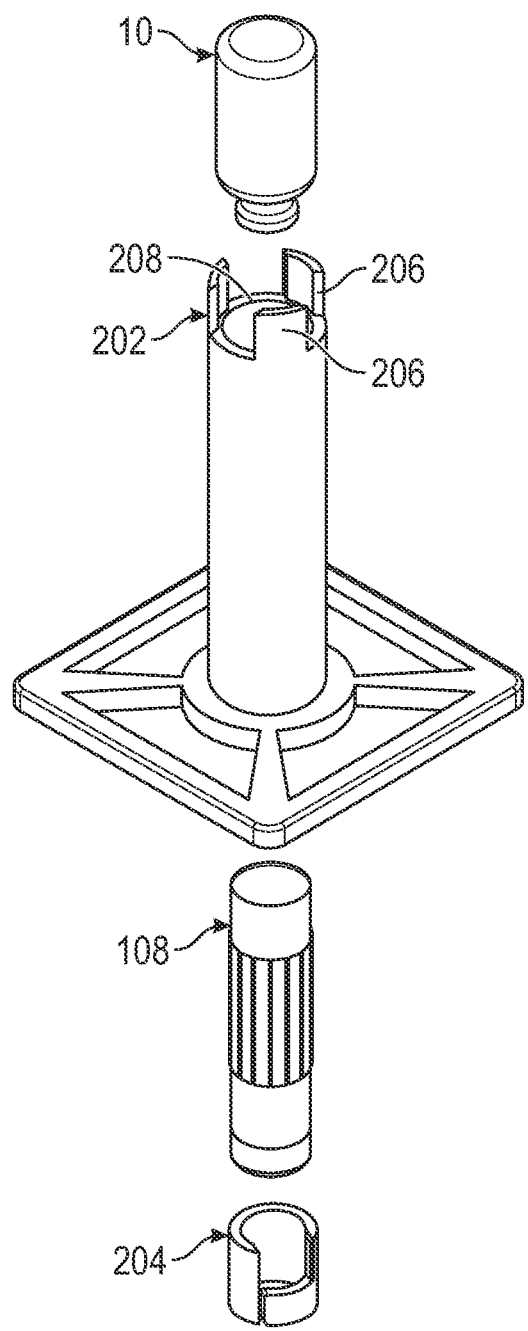
FIG. 4 is an exploded perspective view showing components of a second exemplary embodiment of a vial illumination and inspection system constructed according to aspects of the present disclosure.

Referring to FIG. 4, a second exemplary embodiment of a vial illumination and inspection system 200 constructed according to aspects of the present disclosure will be described. Inspection system 200 is constructed and operated in a similar manner to system 100. In this exemplary embodiment, inspection system 200 includes a vial defect illumination stand 202 that is configured to receive light source 108 within a central cavity from below. A light source pedestal 204 may be provided within illumination stand 202 to retain light source 108 and raise it as close as possible to vial 10. Light from source 108 travels upward through the central cavity of stand 202 to illuminate vial 10, which is received directly in the top of stand 202 in an inverted orientation. In some embodiments, stand 202 is configured to receive a 20 cc glass vial.

The top of illumination stand 202 may be provided with two, three or more castellations 206. In this exemplary embodiment, castellations 206 serve several functions. First, they are configured to hold vial 10 securely while allowing more complete viewing of the illuminated vial. A reduced diameter shoulder 208 at the base of castellations 206 allows the inverted neck of vial 10 to extend into stand 202 but prevents the main body of the vial from descending below castellations 206. Therefore, the bottom heel and entire main body of vial 10 may be viewed as it is rotated within castellations 206. Additionally, castellations 206 serve to releasably interlock with mating recesses on vial adapters, as will be subsequently described, to prevent rotation of the adapters relative to stand 202, and to prevent light from escaping from between the adapters and stand 202.

Figure 5:
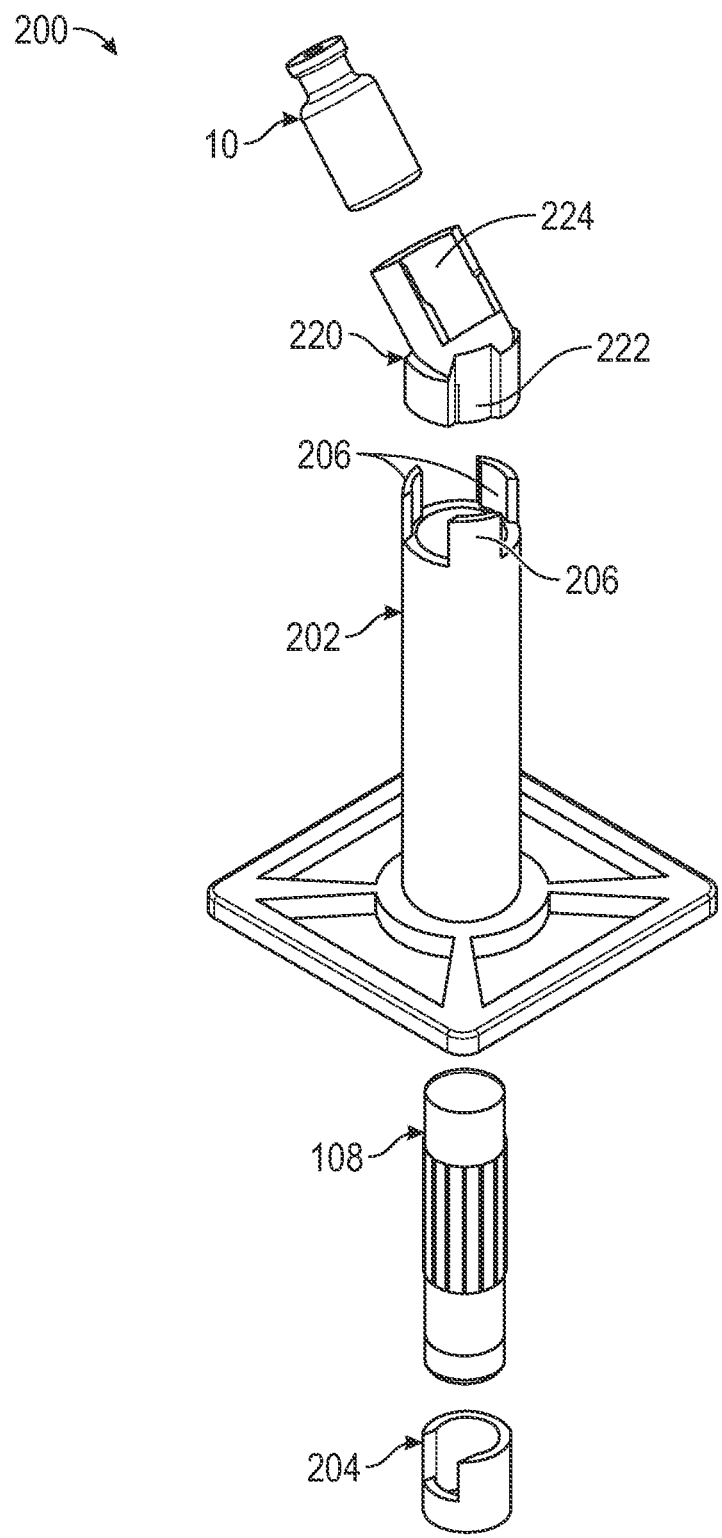
FIG. 5 is an exploded perspective view showing components of the system of FIG. 4 and a vial adapter 220.
Figure 6:
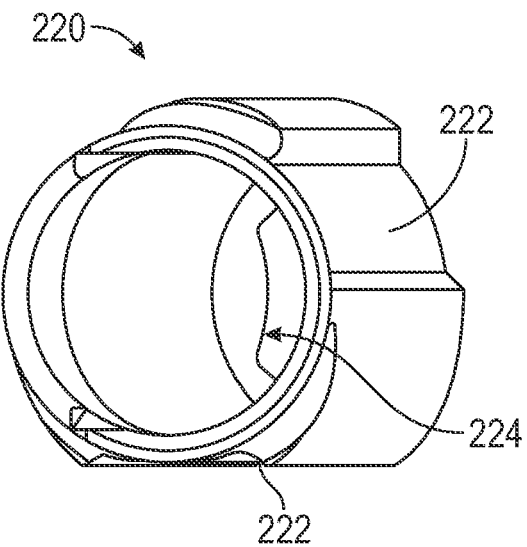
FIG. 6 is a bottom perspective view of the vial adapter of FIG. 5.
Figure 7:
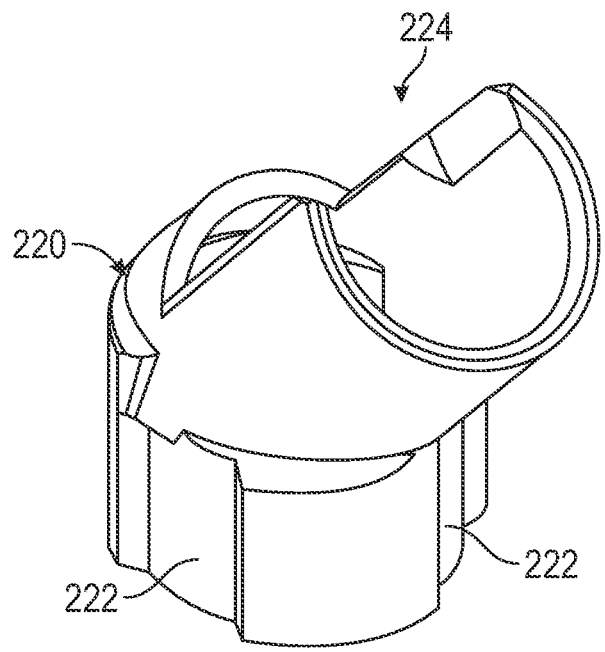
FIG. 7 is a side perspective view of the vial adapter of FIG. 5.
Figure 8:
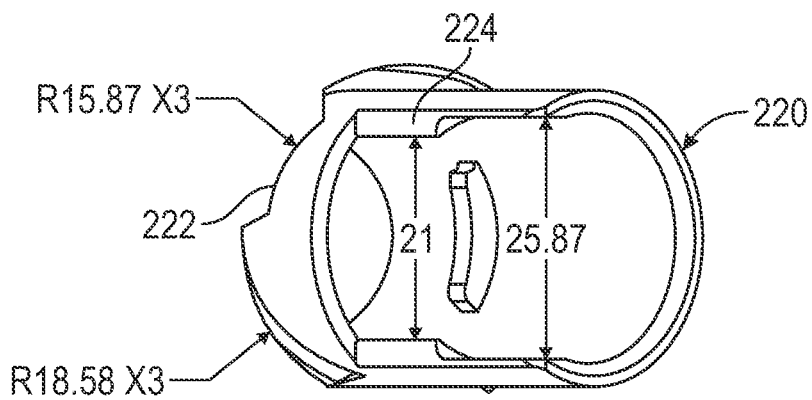
FIG. 8 is a top view of the vial adapter of FIG. 5, with dimensions provided in millimeters.
Figure 9:
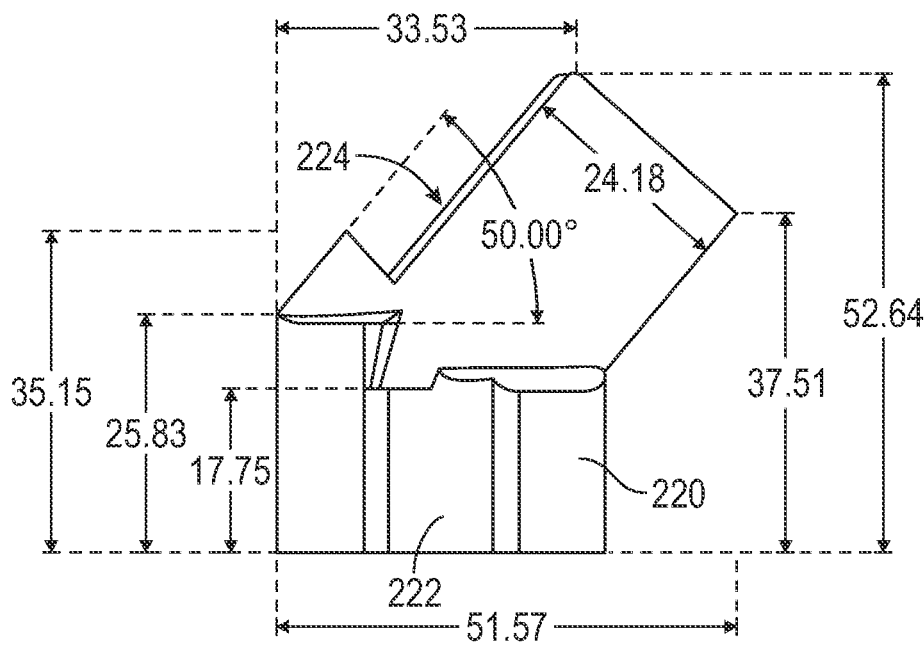
FIG. 9 is a side view of the vial adapter of FIG. 5, with dimensions provided in millimeters.
Figure 10:
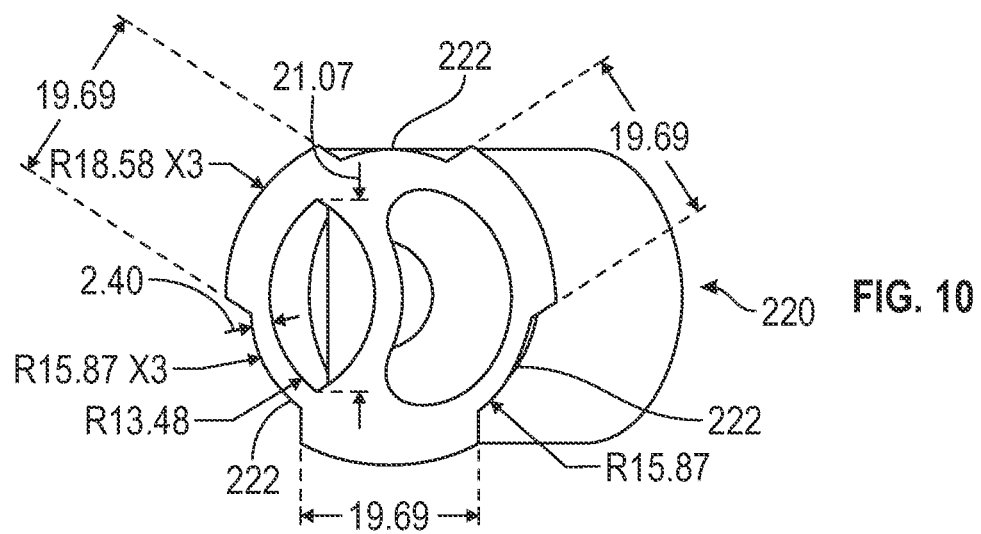
FIG. 10 is a bottom view of the vial adapter of FIG. 5, with dimensions provided in millimeters.

Referring to FIG. 5, vial inspection system 200 is shown with a vial adapter 220. Adapter 220 fits into the top of illumination stand 202 (where a 20 cc vial fits as previously described) and allows a 15 cc vial to be illuminated and inspected for defects. In this exemplary embodiment, adapter 220 has three recesses 222 arranged around its lower periphery and configured to receive the three castellations 206 extending from the top of stand 202. Adapter 220 has a central bore configured to receive a 15 cc vial in an upright orientation. In some embodiments, adapter 220 has a cutout portion 224 as shown that allows part of the main body and/or bottom heel of vial 10 to be inspected. As previously described, the entire main body and/or heel may be inspected by rotating vial 10 within adapter 220. Adapter 220 has an upper portion that may be inclined relative to a lower portion of the adapter. In some embodiments, the angle of inclination is 40 degrees from vertical, as shown in FIG. 9. Applicants have found this angle to provide exceptional illumination of defects in vial 10. In other embodiments, the angle of inclination is between about 20 and about 60 degrees from vertical. Adapter 220 may be made from or coated with a dark colored or opaque material to reduce light bleed through the adapter.

Referring to FIGS. 6-10, various dimensioned views of vial adapter 220 as described above are provided.

Figure 11:
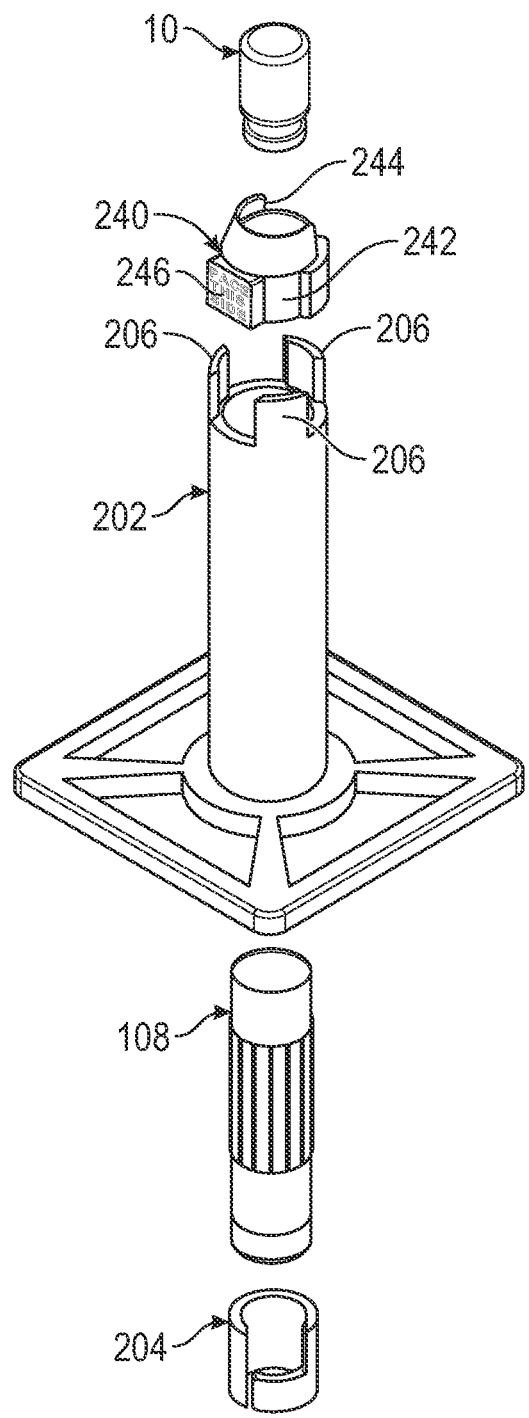
FIG. 11 is an exploded perspective view showing components of the system of FIG. 4 and a vial adapter 240.
Figure 12:
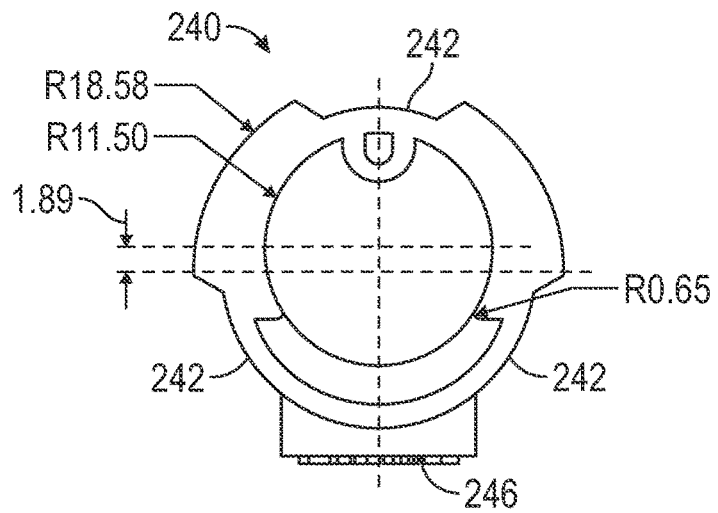
FIG. 12 is a bottom view of the vial adapter of FIG. 11, with dimensions provided in millimeters.
Figure 13:
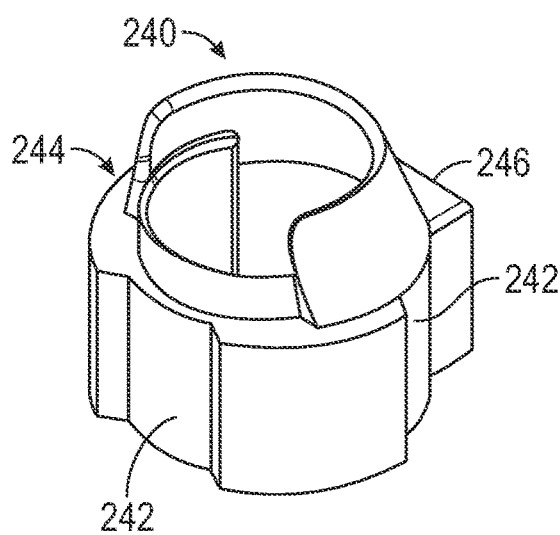
FIG. 13 is a top perspective view of the vial adapter of FIG. 11.
Figure 14:
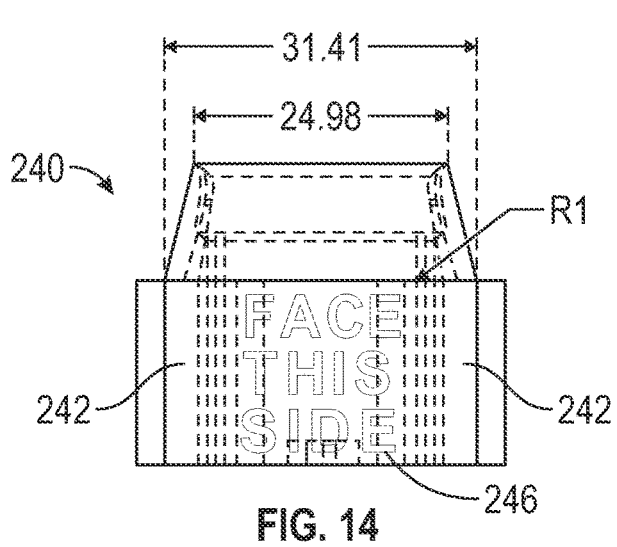
FIG. 14 is a front side view of the vial adapter of FIG. 11, with dimensions provided in millimeters.
Figure 15:
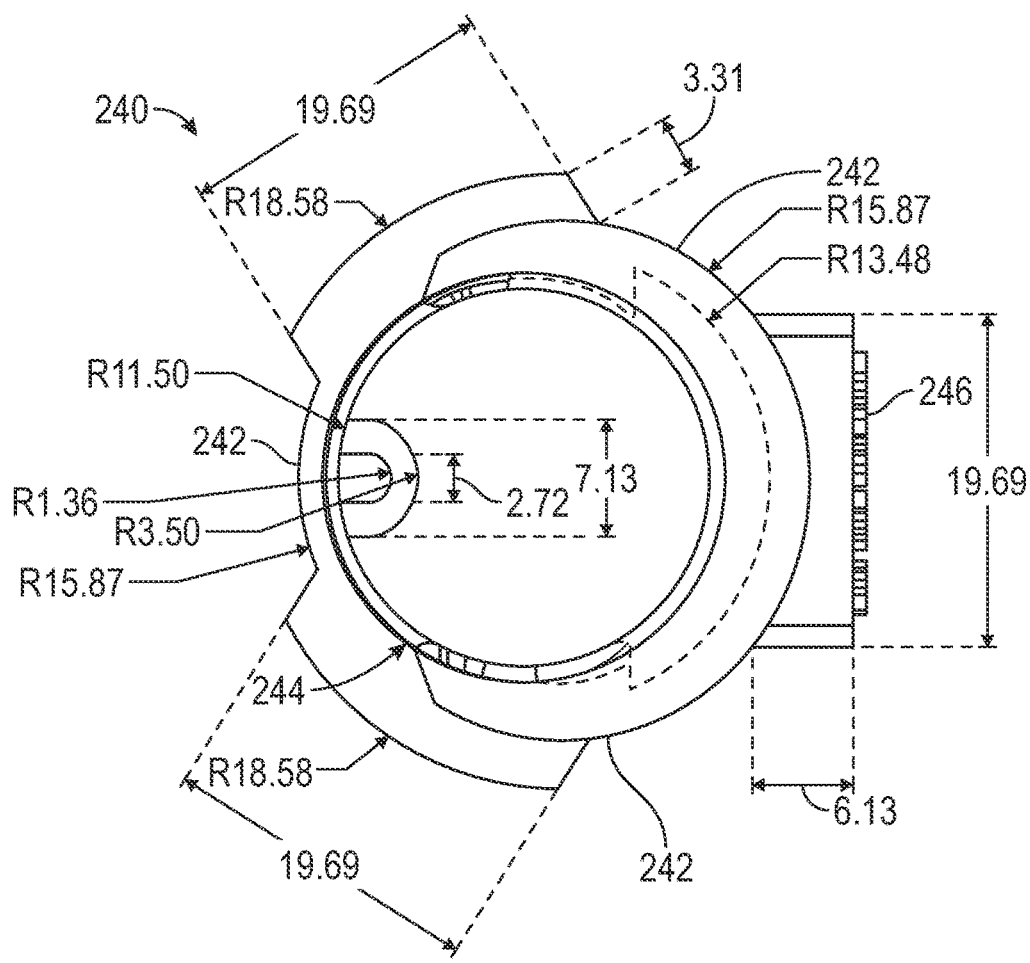
FIG. 15 is a top view of the vial adapter of FIG. 11, with dimensions provided in millimeters.
Figure 16:
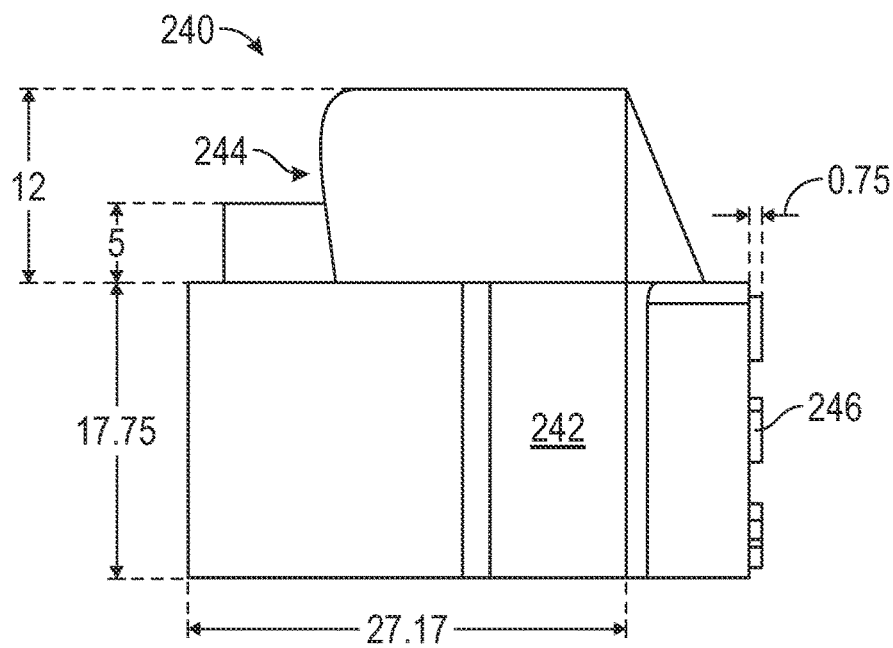
FIG. 16 is a side view of the vial adapter of FIG. 11, with dimensions provided in millimeters.

Referring to FIG. 11, vial inspection system 200 is shown with a vial adapter 240. Adapter 240 fits into the top of illumination stand 202 (where a 20 cc vial fits as previously described) and allows a 6 cc vial to be illuminated and inspected for defects. In this exemplary embodiment, adapter 240 has three recesses 242 arranged around its lower periphery and configured to receive the three castellations 206 extending from the top of stand 202. Adapter 240 has a central bore configured to receive a 6 cc vial in an inverted orientation. In some embodiments, adapter 240 has a cutout portion 244 as shown that allows light from light source 108 to ideally illuminate portions of vial 10 prone to defects while limiting the amount of light that is directed toward the inspector. A label or inscribed printing 246, such as "FACE THIS SIDE", may be provided on adapter 240 opposite cutout portion 244 to indicate which side of adapter 240 should face the inspector.

Referring to FIGS. 12-16, various dimensioned views of vial adapter 240 as described above are provided.

The inspection systems disclosed herein may be used to perform spot checking on a lot of vials or may be used to inspect 100% of the vials in a lot. According to aspects of the present disclosure, in some implementations inspection personnel must first be qualified/certified on the use of the fixtures. Once inspectors are qualified on the proper use of the fixtures, a Good Manufacturing Practice (GMP) inspection and release of a vial lot can occur. In some qualification protocols, a kit may be provided with a vial lot containing defects and acceptable vials numbered and randomly assembled. In some cases, there is a mixing of not less than four acceptable vials to one defect vial. The kit may also include a master defect list that describes the defect categories, types and defect location for each vial contained within the kit. Manual inspectors are considered qualified under some protocols when a 100% detection rate of the defects is achieved.

In some embodiments, the following definitions may be used to categorize defects:

Critical Defect: A defect that affects the safety of the consumer when using the product and/or fails to meet mandatory regulations.

Major Defect: Defects that may negatively affect the functionality of the product.

Minor Defect: Any defect that is known to have no negative affect on the form, fit, or function of product or on patient health.

According to aspects of the present disclosure, an exemplary inspection method is provided below:

Vial Jig Setup and Use
1. Ensure all required materials are available (such as those shown in FIG. 2.).
2. Arrange enhanced inspection device by inserting provided flashlight from under the device with light facing upward. Flashlight should be set to the "bright" setting. This is achieved by pressing the power button once when turning on.
Note: Flashlight batteries should be replaced at the start of each day, prior to any inspection.
3. Insert 3D printed prop under flashlight to push flashlight up to specified height.
4. Place device in front of the black background. Ensure side with label "FACE THIS SIDE" is facing you.
5. Adjust booth and chair so that top of the jig is approximately at eye level.

Enhanced Focused Inspection Technique
1. Prior to inspection of the Lensed Vial Defect Kit, use the technique described in Steps 2 and 3 to inspect the labeled and unlabeled example defect vials provided. Ensure chair and booth are adjusted to individual height for ergonomic and proper inspection using the jig.
2. Carefully invert vial and place on the opening of the device.
3. Slowly and gently rotate vial for at least two (2) full rotations and inspect heel region for defects against the black background only. DO NOT rotate the jig. Keep jig stationary (use one hand to stabilize if needed) and rotate vial within jig using index finger.

Each vial inspection must be at least 10 seconds in length, but can be longer if needed. There is no time constraint to the inspection of each vial.

4. If a vial is free of defects in the heel region, place the vial in the 'Acceptable' tray.
5. If a vial has a critical defect in the heel region*, cull and separate from population, place vial in the 'Reject' tray. DO NOT flip any caps off of rejected vials. Simply segregate from the main population.
*If any other heel defects are observed, they should be culled (see defect types listed above.)
6. Take a stretch break every 15 minutes for 5 minutes.
7. Repeat steps 2-6 until all vials in kit have been inspected.
8. Once all vials have been inspected, record results in protocol data sheet.

What is claimed is:

1. A glass vial illumination and inspection system comprising:
a light source;
a stand having an internal cavity configured to receive at least a portion of the light source;
a recess located in the stand and configured to receive at least a portion of a glass vial,
wherein the light source is a flashlight and the stand is configured to receive the flashlight in a central bore therein,
wherein the stand is configured to aim light output from the light source toward the glass vial to illuminate the vial, and wherein the stand is configured to position the vial such that an inspector can manually inspect the illuminated vial for defects.

2. The system of claim 1, wherein the stand is configured to hold the light source in a vertical orientation and configured to hold the vial above the light source.

3. The system of claim 1, wherein the stand further comprises a base having a generally square shape.

4. A glass vial illumination and inspection system comprising:
a light source;
a stand having an internal cavity configured to receive at least a portion of the light source;
a recess located in the stand and configured to receive at least a portion of a glass vial,
wherein the stand is configured to aim light output from the light source toward the glass vial to illuminate the vial, and wherein the stand is configured to position the vial such that an inspector can manually inspect the illuminated vial for defects,
wherein a top portion of the stand is provided with at least two castellations.

5. A glass vial illumination and inspection system comprising:
a light source;
a stand having an internal cavity configured to receive at least a portion of the light source;
a recess located in the stand and configured to receive at least a portion of a glass vial,
wherein the stand is configured to aim light output from the light source toward the glass vial to illuminate the vial, and wherein the stand is configured to position the vial such that an inspector can manually inspect the illuminated vial for defects,
wherein a top portion of the stand is configured to hold a first type of vial, and the top portion is configured to releasably receive a vial adapter for holding a second type of vial that is different from the first type of vial.

6. The system of claim 5, wherein the adapter includes a plurality of recesses around its circumference, wherein the recesses are configured to mate with castellations extending from the stand.

7. The system of claim 6, wherein the recesses and castellations cooperate to prevent the adapter from rotating with respect to the stand.

8. The system of claim 5, wherein the system further comprises multiple vial adapters, each configured to receive a different type of vial.

9. The system of claim 5, wherein the system further comprises a vial adapter configured to hold a vial at a non-vertical angle.

10. The system of claim 9, wherein the vial adapter is configured to hold a vial at an angle that is about 40 degrees from vertical.

11. The system of claim 1, further comprising a bottom lid configured to releasably retain the light source within the internal cavity of the stand.

12. A method of inspecting a glass vial, the method comprising:
   providing the illumination and inspection system of claim 1;
   inserting a glass vial into the recess of the stand; and
   inspecting the vial for defects.

13. The method of claim 12, further comprising spinning the vial within the recess while inspecting the vial for defects.

14. The method of claim 13, wherein the vial is spun at least two revolutions.

* * * * *